United States Patent [19]
Kasahara

[11] 3,772,908
[45] Nov. 20, 1973

[54] GAS LIGHTER TESTING DEVICE

[75] Inventor: Riichiro Kasahara, Kobe, Japan

[73] Assignee: Shin Cosmos Denki Kabushiki Kaisha, Osaka, Japan

[22] Filed: June 4, 1971

[21] Appl. No.: 150,033

Related U.S. Application Data

[63] Continuation-in-part of Ser. No. 6,992, Jan. 30, 1970.

[30] Foreign Application Priority Data
Feb. 6, 1969 Japan.............................. 44/10313

[52] U.S. Cl......................... 73/27 R, 73/49.3, 73/52
[51] Int. Cl...................... G01m 3/26, G01n 31/06
[58] Field of Search....................... 73/23, 27, 49.2, 73/49.3, 52, 23, 27 R; 324/71 NE; 338/34

[56] References Cited
UNITED STATES PATENTS

| | | | |
|---|---|---|---|
| 2,169,605 | 8/1939 | Griese | 73/52 X |
| 3,603,954 | 9/1971 | Takeuchi | 73/23 X |
| 3,507,145 | 4/1970 | Loh | 73/27 R X |
| 3,611,243 | 10/1971 | Hardtl | 73/23 X |
| 3,564,474 | 2/1971 | Firth et al. | 73/27 R X |

FOREIGN PATENTS OR APPLICATIONS

| | | | |
|---|---|---|---|
| 62,175 | 6/1968 | Germany | 73/49.3 |
| 1,202,512 | 8/1970 | Great Britain | 73/52 |

OTHER PUBLICATIONS

Seiyama et al., "Study on a Detector for Gaseous Components Using Semiconductive Thin Films," Analytical Chemistry, Vol. 38, No. 8, July 1966, 1,069–1073.

Primary Examiner—Charles A. Ruehl
Attorney—Eugene E. Geoffrey, Jr.

[57] ABSTRACT

A testing device for gas lighters having a container for holding the lighter, a gas detecting element within the container and an associated electric circuit including indicating means, said circuit having voltage control means to compensate for the gas volume of the lighter and the period of time the lighter is required to retain the gas therein.

4 Claims, 10 Drawing Figures

PATENTED NOV 20 1973 3,772,908

INVENTOR.
RIICHIRO KASAHARA
BY Eugene Hoffey
ATTORNEY

INVENTOR.
RIICHIRO KASAHARA

GAS LIGHTER TESTING DEVICE

This application is a Continuation-In-Part of application Ser. No. 6,992 filed Jan. 30, 1970.

This invention relates to a gas lighter testing device and, more specifically to novel and improved testing apparatus which can easily measure the rate of leakage of gas and provide accurate and reliable judgment of the effective usable time after filling the gas lighter with fuel gas.

In the case of testing gas lighters, it is customary to measure gas concentration resulting from gas leakage by placing the gas lighters in a container. However, the lighters are so different in size that the ratio of volumes of the container and the gas lighter will vary materially. Furthermore, lighters are not uniformly filled, so that the conditions of gas leakage will also vary. Therefore, the measured value of the gas concentration will not afford a reference value for correct judgment of the effective usable time of the gas lighter, even if the gas concentration is correctly indicated by an ammeter. In the manufacture of gas lighters, therefore, it has been desirable to provide a gas lighter testing device which can easily and accurately determine the rate of gas leakage from the gas lighter and afford a direct indication of the effective usable time.

Therefore, one object of this invention is to provide a novel and improved gas lighter testing device which is characterized by its simplicity of structure and ease of operation so that the time for which the gas lighter can retain its fuel can be quickly determined.

The gas lighter testing device according to this invention comprises a testing chamber having a predetermined volume, gas detecting means including a gas detecting element which is disposed in said testing chamber for detecting the gas concentration in said chamber and producing an electric signal corresponding to said gas concentrations, means of receiving said electric signal and indicating it as the gas concentration, and a compensation circuit connected between said gas detecting means and said indicating means for compensating said electric signal in accordance with the volume of the gas lighter to be tested.

According to an embodiment of this invention, the gas detecting element comprises a helical coil of a metal wire, such as platinum or palladium, which is not readily oxidized at high temperature, for heating the element to a predetermined temperature, an insulation coating of an inorganic oxide material, such as activated terra abla, bentonite, alumina or magnesia, formed around the coil, a pair of electrode wires, such as of platinum or palladium arranged in parallel at the both sides of the coated coil and a semiconductor coating consisting of a metal oxide semiconductor such as $Nb_2O_5$, $Ta_2O_5$, $V_2O_5$, ZnO $SnO_2$, $TiO_2$ or $Fe_2O_3$ enclosing the coil, insulating coating and electrode wires. Such metal oxide semiconductors vary their electric conductivities when they absorb a specific gas and this conductivity variation corresponds to a gas concentraion and is detected as an electric signal from the pair of electrode wires.

According to another embodiment of this invention, the indicating means includes a fluorescent indicating tube which is calibrated to provide a direct indication of the gas concentration.

The above and other objects and features of this invention will be more clearly understood from the following description with reference to the accompanying drawings.

In the drawings.

Throughout the drawings, like reference numerals are used to corresponding structural components.

Figure 1:
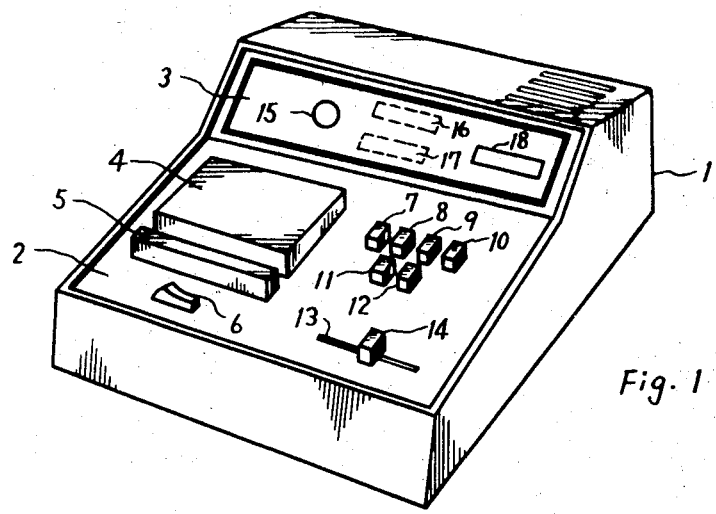
FIG. 1 is a perspective view of an embodiment of gas lighter testing device according to this invention.

Referring to FIG. 1 representing a preferred embodiment of this invention, a cabinet 1 has a relatively low front portion and a relatively high rear portion. An operating panel 2 is attached to the upper face of the front portion and an indicating panel 3 is attached to the front face of the rear portion. The operating panel 2 is provided with a cover 4 of a testing chamber which is housed in the cabinet 1, a bar-Shaped push button 5 for opening the cover 4, a power source switch knob 6, sensitivity control push buttons 7, 8, 9, 10, 11 and 12, and a zero adjusting knob 14 which projects from an elongated slit 13. The indicating panel 3 is provided with a pilot lamp 15, an UNDER TEST indicating window 16, a TEST FINISH indicating window 17 and a window 18 for a fluorescent tuning indicating tube, such as the so-called "magic eye".

The testing chamber 19 shown in detail in FIGS. 2 through 8 contains a gas lighter to be tested and is fixed to the bottom of the cabinet 1 by means of screws threadably engaging holes 20. The testing chamber 19 has an inclined opening 21 which coincides with the inclined edge 22 (FIG. 8) of the cover 4. Felt packing 23 is attached to the edge 21 of the chamber 19 to prevent the escape of gas leaking from the gas lighter under test. Projections 24 extending from the rear edge of the opening of the chamber 19 are coupled with projections 25 on the cover 4 by means of a shaft 26 so that the cover 4 can be freely opened and closed. The cover 4 includes a coiled spring 27 wound on the shaft 26 so that it will immediately open upon release of a latch.

Figure 7:
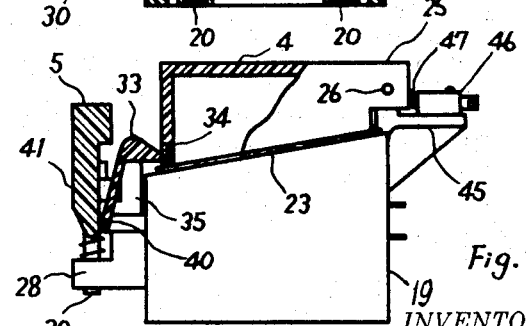
FIG. 7 is a partially sectional side view along the line VII—VII of FIGS. 2 and 3.
Figure 5:
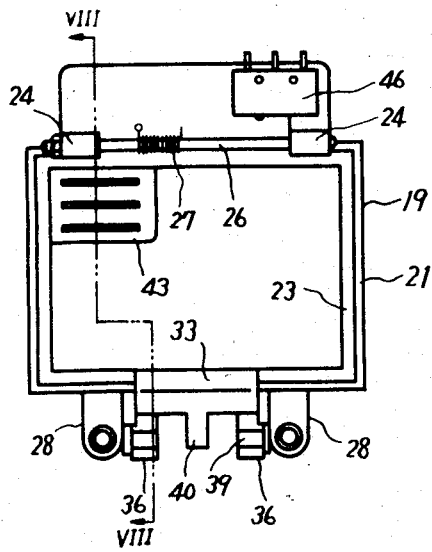
FIG. 5 is a plan view of the testing chamber of FIGS. 2, 3 and 4 with the cover removed to show the interior thereof.

The front face of the testing chamber 19 is provided with a pair of U-shaped members 28 having legs projecting forwardly and supporting a pair of vertical shafts 30 extending through openings in the legs. On the tops of said vertical shafts 30 is the bar-shaped push button 5 which is always urged upwardly by a pair of coiled springs 32 disposed respectively between a flange 31 fixed to each shaft 30 and the lower leg of each U-shaped member 28. The cover 4 is kept closed by a hook member 33 which engages a stop groove 34 (FIG. 7) on the cover 4. The hook member 33 has a pair of L-shaped legs 35 extending downwardly from each end thereof. The horizontal portions 36 of the L-shaped legs 35 are respectively disposed between pairs of guides 37 and 38 projecting from the front face of the testing chamber 19 so that the L-shaped legs 35 can slide forward and backward together with the hook 33. The hook member 33 also has a leaf spring portion 40 which is formed integrally therewith and extend obliquely downwardly as shown in FIG. 7. An inwardly inclining slope 39 is formed at the top of the horizontal portion 36 of each L-shaped leg 35.

The bar-shaped push button 5 has a relatively long central leg 41 and a pair of relatively short side legs 42, which extend downwardly. The lower end portion of the central leg 41 is in contact with the lower end of the leaf spring portion 40 of the hook member 33 when the cover 4 is closed. The side legs 42 have outwardly inclined sloping portions at the tops which are complementary to and in contact with the slopes 39 of both L-shaped legs 35 of the hook member 33. In the normal condition, the leaf spring 40 is urged by the central leg 41 so that the hook member 33 engages with the stop groove 34 of the cover 4 to keep it in the closed position.

Figure 8:
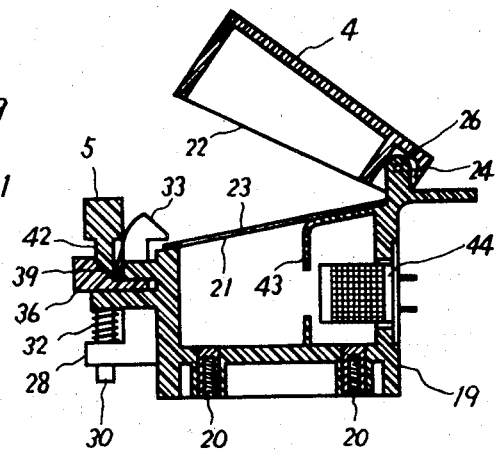
FIG. 8 is a cross-sectional side view of the testing chamber taken along the line VIII—VIII of FIG. 5 and with the cover open.

When the push button 5 is pushed downwardly the horizontal portions 35 of the L-shaped legs 35 are pushed forwardly by the side legs 42 by reason of their sloped faces, so that the hook member 33 moves backwardly with respect to the cover 4 and disengages the stop groove 34, thereby allowing the cover 4 to open of itself as shown in FIG. 8. Since the leaf spring 40 is also stressed when the hook member 33 moves away from the cover 4, the hook member 33 returns automatically to the initial position when the push button is released. Therefore, if the cover 4 is closed by hand, the hook 33 engages with the stop groove 34 to lock the cover in the closed position.

A partition wall 43 is provided in a corner of the interior of the testing chamber 19 and surrounds a gas detecting element 44. A switch 46 for starting the test is carried by a bracket 45 extending from the rear wall of the chamber 19 and is arranged so that its operating button 47 is pushed by the projection 25 of the cover 4 when the cover is closed and released when the cover is opened. Thus, the testing operation is automatically started when a lighter to be tested is placed in the testing chamber 19 and the cover 4 is closed.

Figure 9:
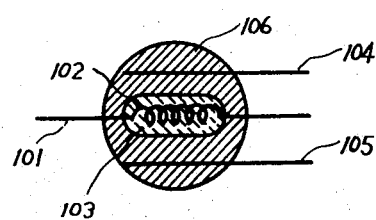
FIG. 9 is a schematic cross-sectional viewf a gas detecting element used in the gas lighter testing device of this invention.

A preferred example of the gas detecting element 44 is schematically shown in FIG. 9. A coiled portion 102 formed of a refractory nonoxidizable metal wire such a platinum or palladium is coated with an insulating material 103 of an inorganic oxide material such as activated terra abla, bentonite, alumina or magnesia. A pair of electrode wires 104 and 105, such as of platinum or palladium are disposed in parallel with the coiled portion 102 and on both sides thereof. This assembly is enclosed within a sintered block 106 of a metal oxide semiconductor material, such as $Nb_2O_5$, $Ta_2O_5V_2O_5$, ZnO, $SnO_2$, $TiO_2$ and/or $FE_2O_3$, with a small amount of additive, such as Pt, Pd, Ir, Rh and/or Au.

When the element is heated to 150° to 300°C by supplying an electric current to the heater element 101, the metal oxide semiconductor block 106 varies in electric conductivity if it contacts a reducing gas. This results in a change in the electrical resistance between both electrode wires 104 and 105.

Figure 10:
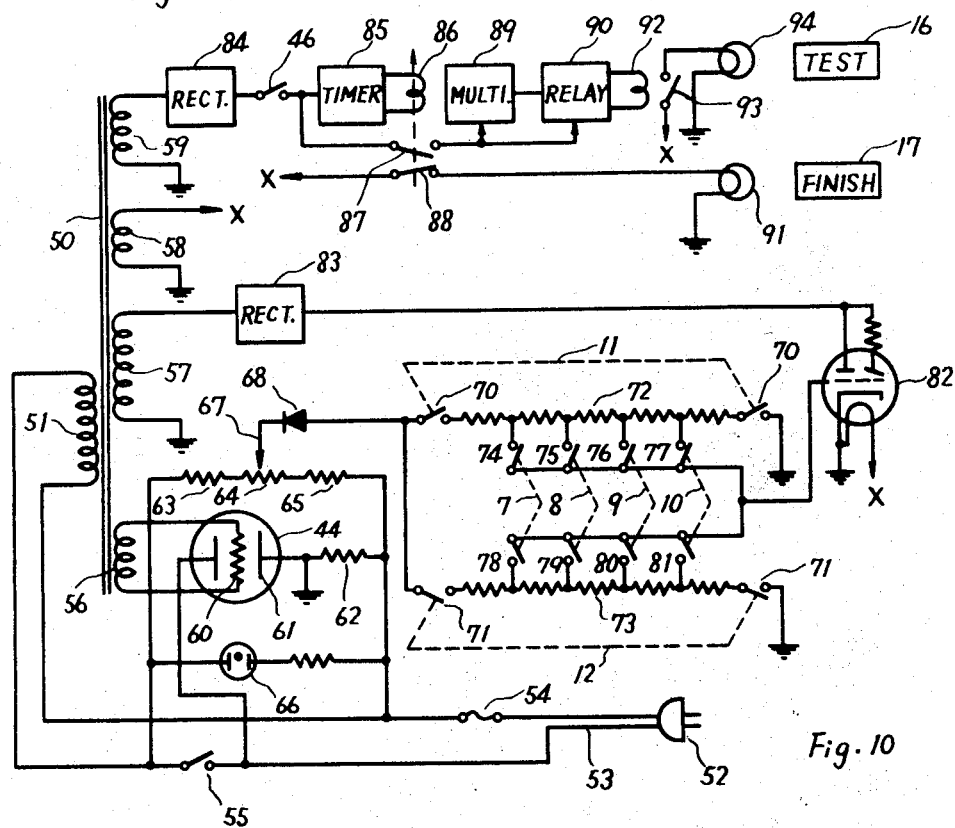
FIG. 10 is a circuit diagram, partly in block form, representing an embodiment of gas lighter testing device according to this invention.

This gas detecting element is shown schematically in FIG. 10 and denoted by numeral 44. FIG. 10 represents a circuit of an embodiment of gas lighter testing device according to this invention. In the drawing, a primary winding 51 of a transformer 50 is connected through a fuse 54, a switch 55 and a cord 53 to a plug 52 which may be plugged in a conventional commercial power supply. The transformer 50 has four secondary windings 56, 57, and 59.

The first secondary winding 56 is connected to a heating element 60 of the gas deteching element 44, which corresponds to the coiled portion 102 in FIG. 9, to apply a low heating voltage of 1.3 volts thereto to heat the elemnt at the above mentioned operating temperature. The detecting element 44 is connected in series with a resistor 62 and between the source conductors at a point in advance of switch 55, so that it is always supplied with a commercial source voltage for preheating the element.

A parallel circuit of a series connection of resistors 63, 64 and 65, and an enabling circuit of a neon lamp 66 is also connected between the source conductors at a point following the switch 55. The junction between the element 44 and the resistor 62 is grounded. The resistor 64 has a movable arm 67 which is operated by the above mentioned zero adjusting knob 14. Thus, the element 44 and the resistors 62, 63, 64 and 65 constitute a bridge circuit including the movable arm 67 as its output terminal. The neon lamp 66 is disposed behind the pilot lamp window 15 on the indicating panel 3 (FIG. 1).

The output of the bridge circuit derived from the movable arm 67 is coupled through a rectifier 68 to either of series resistors 72 and 73 selectively by switches 70 and 71 which are respectively operated by the aforementioned push buttons 11 and 12. Each of the series resistors 72 and 73 has four intermediate taps. The intermediate taps of the series resistor 72 are respectively connected through switches 74, 75, 76 and 77 to the grid electrode of a tuning indicating tube 82 and the intermediate taps of the series resistor 73 are respectively connected through switches 78, 79, 80 and 81 to the same grid electrode. The four pairs of switches 74–78, 75–79, 76–80 and 77–81 are respectively controlled by the push buttons 7, 8, 9 and 10.

The push buttons 7, 8, 9 and 10 preselected in accordance with 1.5, 2, 2.5 and 3 grams of the tank content of the gas lighter to be tested, and the push buttons 11 and 12 are preselected in correspondence with a four month and a one month period of use. Accordingly, the respective taps of the series resistors 72 and 73 are arranged so as to obtain a ratio of voltage division which is inversely proportional to the contents of the lighter, and the respective values of the series resistances 72 and 73 are selected so that four times the voltage is applied to the indicating tube 82 by the switch 70, with respect to the voltage applied by the switch 71.

The second secondary winding 57 of the transformer 50 is connected through a rectifier circuit 83 to the anode electrode and the target electrode of the indicating tube 82. A voltage of 250 volts generated by the secondary winding 57 is rectified and filtered and applied to the tube 82.

The third secondary winding 58 generates a voltage of 6.3 volta to be applied to the cathode heater of the indicating tube 82 and the pilot lamps 91 and 94.

Figure 2:
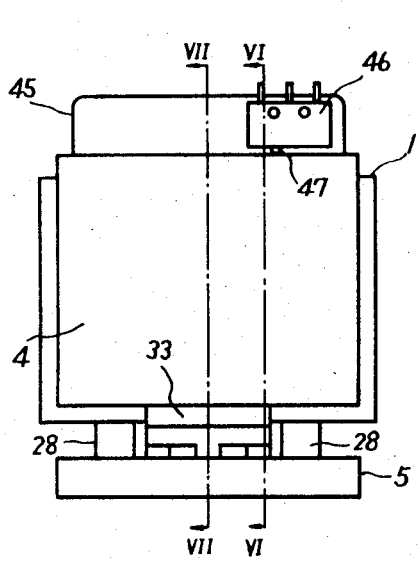
FIG. 2 is a plan view of an embodiment of testing chamber of the gas lighter testing device of FIG. 1 with its cover closed.
Figure 3:
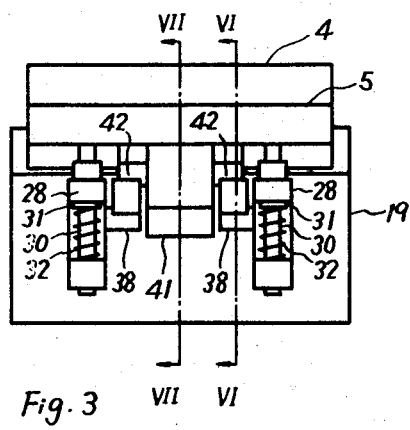
FIG. 3 is a front view of the testing chamber of FIG. 2.
Figure 4:
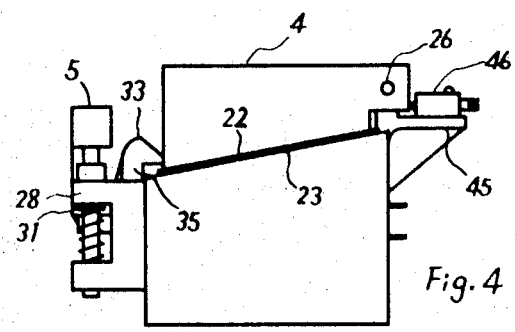
FIG. 4 is a side view of the testing chamber of FIGS. 2 and 3.
Figure 6:
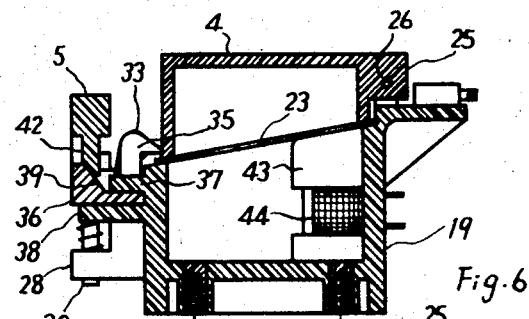
FIG. 6 is a cross-sectional side view taken along the line VI—VI of FIGS. 2 and 3.

The fourth secondary winding 59 which generates a voltage of 12 volts is connected through a rectifier 84 and a switch 46 which corresponds to the switch 46 in FIGS. 2, 4 and 7 to a timer 85 having a relay 86. The timer 85 is arranged to produce an output to energize the relay 86 for one minute after the switch 46 is closed. The relay 86 includes a normally-open contact 87 and a normally-closed contact 88. The contact 87 is inserted between the switch 46 and an astable multivibrator 89 and relay amplifier 90, and the contact 88 is inserted between the secondary winding 58 and the pilot lamp 91 which is disposed behind the indicating window 17 (FIG. 1). The output of the astable multivibrator 89 is amplified by the amplifier 90 and intermittently energizes a relay 92 having a normally-open contact 93 inserted between the pilot lamp 94 and the secondary winding 58. The pilot lamp 94 is disposed behind the indicating window 16 (FIG. 1).

In operation, when the source switch 55 is closed, a heating current is applied to the heating element 60 of the gas detecting element 44 and a cathode heater current and an anode current are also applied to the indicating tube 82. Observing an indication pattern of the indicating tube 82 through the window 18, the movable arm 67 of the resistor 64 is adjusted by the knob 14 so that the pattern is just closed. Then, one of the push buttons 7, 8, 9 or 10 which corresponds to the volume of the tank of the lighter to be tested is pushed and either of the push buttons 11 and 12 is also pushed. Then, the cover 4 of the testing chamber 19 is opened, the lighter to be tested is placed therein, and the cover 4 is closed.

Closure of the cover 4 results in closure of the switch 46, and the relay 86 is energized to close the switch 87 and open the switch 88. Thus, the lamp 91 is turned off and the astable multivibrator 89 begins to oscillate. The astable multivibrator 89 energizes the relay 92 intermittently and turns on and off the lamp 94 to indicate UNDER TEST.

In the meantime, the gas leaking from the lighter spreads in the testing chamber 19 and is adsorbed by the gas detecting element 44. Thus, the current across the detecting element 44 increases and the indication pattern of the indicating tube 82, which is initially closed by zero adjustment gradually opens.

One minute after closure of the cover 4, the output of the timer 85 terminates and the relay 86 is deenergized. Thus, the multivibrator 89 and the relay amplifier 90 are deenergized and, therefore, the relay 92 is also completely deenergized to turn off the lamp 94. But, the lamp 91 is turned on to indicate TEST FINISH.

Observing the indication pattern of the indicating tube 82 at this time, if the pattern opens above a predetermined limit, it indicates that the gas in the lighter will completely leak out during the period selected by the push button 11 or 12, and, if the aperture of the pattern is within a predetermined limit, it indicates that the gas will not leak out completely during this period.

As described in the above, according to this invention, life test of gas lighters, which has never been carried out accurately and conveniently, can be done easily and quickly. Moreover, the testing device of this invention is compact and highly portable.

While only one embodiment of the invention has been illustrated and described, it is understood that alterations, modifications and changes may be made without departing from the spirit and scope of the invention as defined by the appended claims. For example, the indicator need not be a fluorescent indicating tube but a meter indicator or the like can be used for the same prupose. Moreover, any kind of gas sensing element other than that described above can be utilized as the gas detecting element.

What is claimed is:

1. A gas lighter testing device comprising an airtight testing chamber having a geometry adapted for receiving a gas lighter to be tested, said chamber including an opening for insertion and removal of a lighter and a door for sealing said opening, a metal oxide semiconductor gas sensing element within said chamber, said element changing its electroconductivity upon contact with gas contained in said logihter and liberated therefrom, electric circuitry interconnected with said element and producing an output voltage proportional to the electroconductivity of said element, a fluorescent indicating tube, an adjustable voltage dividing network connected to said electric circuitry and to said indicating tube for feeding said voltage to said indicating tube and controlling sensitivity of said tube, a timer including activating means therefor for starting the timer upon the initiation of a test and indicating means operated by said timer to indicate the start and termination of said test.

2. A gas lighter testing device according to claim 1 wherein said gas sensing element comprises an electric heating element made of refractory metal, means for energizing said heating element, at least one electrode disposed in proximity to said heating element and a metal oxide semiconductor body enclosing said heating element and electrode.

3. A gas lighter testing device according to claim 1 wherein the said metal oxide semiconductor material is formed by at least one material selected from the group consisting of $Nb_2O_5$, $Ta_2O_5$, $SnO_2$, $TiO_2$ and $Fe_2O_3$.

4. A gas lighter testing device according to claim 1 wherein said voltage dividing network is provided with switches to change the magnitude of said output voltage from said gas sensing element in correspondence with the volume of gas of the gas lighter to be tested and the effective usable time of said gas lighter.

* * * * *